United States Patent [19]

Whitney

[11] 4,160,563
[45] Jul. 10, 1979

[54] PICK-UP TOOL

[76] Inventor: Donald S. Whitney, 1118 Baldwin St., Harlan, Iowa 51537

[21] Appl. No.: 744,934

[22] Filed: Nov. 24, 1976

[51] Int. Cl.² .............................................. B25J 1/00
[52] U.S. Cl. .................................. 294/19 R; 294/104
[58] Field of Search ................... 294/11, 19 R, 20, 22, 294/50.8, 50.9, 100, 104, 115; 119/154; 267/69, 73, 74

[56] References Cited

U.S. PATENT DOCUMENTS

| 342,827 | 6/1886 | Evans | 294/22 |
|---|---|---|---|
| 1,322,537 | 11/1919 | Cartwright | 294/50.9 |
| 2,117,322 | 5/1938 | Hillman | 267/69 |
| 2,469,865 | 5/1949 | Crow | 294/104 |
| 2,807,495 | 9/1957 | Pillstrom | 294/19 R X |
| 3,069,195 | 12/1962 | Buck | 294/104 X |
| 3,146,015 | 8/1964 | Roberge | 294/19 R |

FOREIGN PATENT DOCUMENTS 849366  9/1960  United Kingdom ................. 294/19 R Primary Examiner—Johnny D. Cherry
Attorney, Agent, or Firm—Hiram A. Sturges

[57] ABSTRACT

A pick-up tool comprising an elongated hollow shank having a fixed jaw at one end, a pivoting jaw opposite the fixed jaw, a handle transverse to the shank, a trigger adjacent the handle and moveably mounted thereon, a connection member attached to the moveable jaw and to the trigger, and a spring urging the moveable jaw into an open position.

The moveable jaw closes into a notch in the forward end of the fixed jaw. A major portion of the length of the moveable jaw is closely adjacent to the fixed jaw when the jaws are in a position of being closed to the maximum. The connection member is flexible and has a slacking section urged toward a slack position by a spring secured to the ends of the slacking section, the connection member being drawn taut by a sufficient movement of the trigger.

8 Claims, 2 Drawing Figures

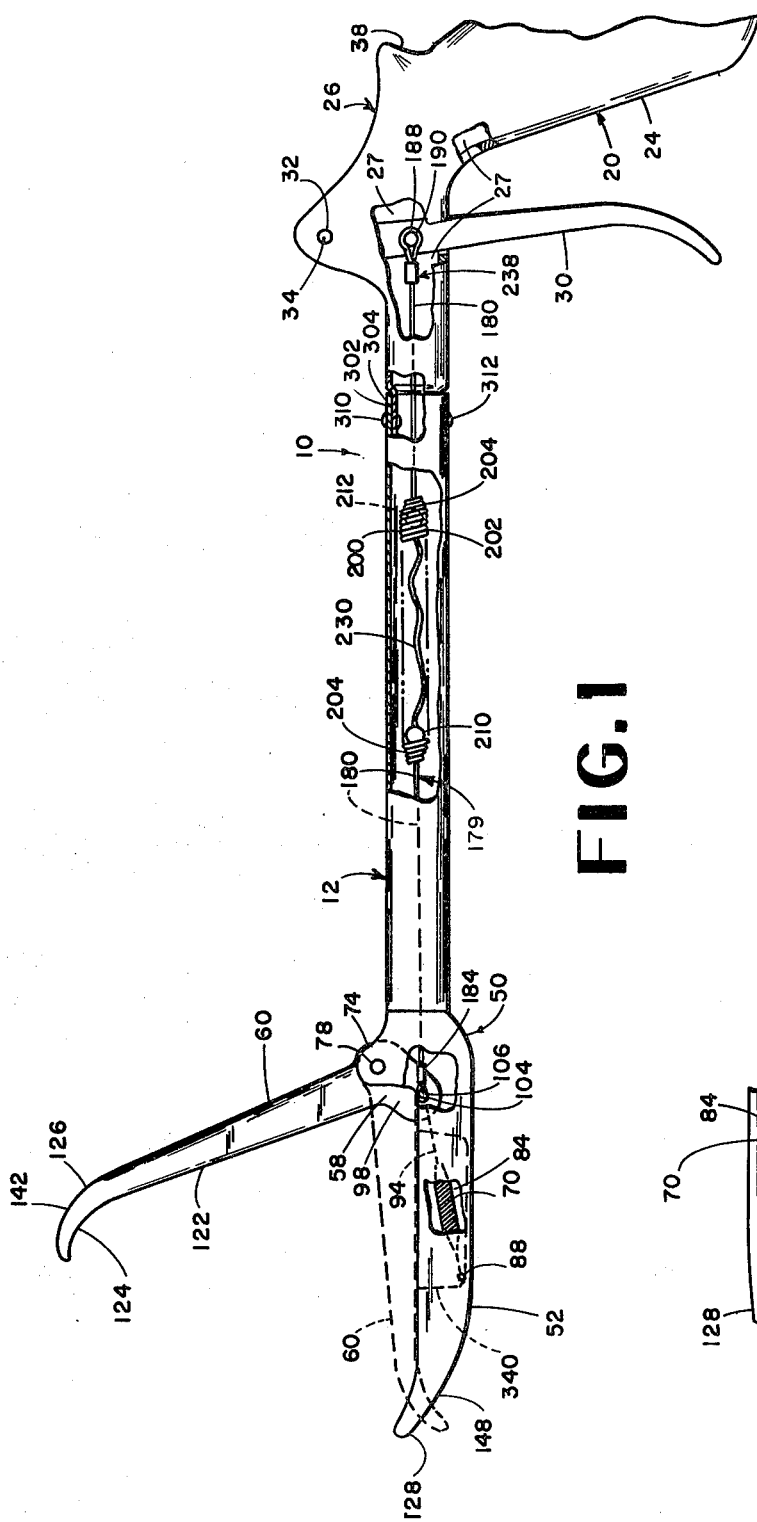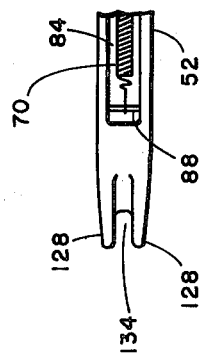

PICK-UP TOOL

BACKGROUND OF THE INVENTION

Pick-up tools of the prior art have had the moveable jaw connected to a trigger by a stiff rod whereby it is difficult to carefully press the trigger just enough to avoid injury to an animal which it is desired to pick up. This can be important in picking up a kitten or many fast moving animals. The very speed of the amimal requires fast action on the part of the operator and it is easy for the operator to become excessively excited and squeeze the trigger sufficiently enough to injure the animal. This problem is also involved in the catching of snakes. In some areas of the country poisonous snakes can be sold if caught alive so that their venom can be extracted and used.

To cushion the jaws by placing resilient material such as foam rubber or the like on the opposite surfaces of the jaws has its disadvantages. Such materials are weak by nature and tend to break off. Anything added to the jaws can tend to become unglued, particularly when the tool is used out in the rain and in damp grasses.

My solution for this problem involves a flexible cable or connection member between the trigger and the moveable jaw and which has a slacking portion which can be caused to assume a slack condition whenever the trigger is released, since a spring extends across a slacking portion drawing its ends towards each other. When the operator grips an animal he can easily sense through his fingers when the spring is being extended and at that moment there is a sufficient pressure for holding a kitten, snake or other animal. The operator, sensing this, can cease to exert further pressure more than necessary to maintain the extension of the spring without allowing the spring to become overcome to an extent such as would straighten out the slacking portion of the cable. This construction has advantage because it is also possible when heavy objects are being gripped, or whenever desired, to use maximum hand pressure, drawing the cable completely taut, and exerting maximum pressure at the jaws.

With this construction the operator can either be very gentle with an animal or he can be very forceful when gentleness is not needed.

The prior art contains jaws which overlap but to my knowledge does not contain a fixed jaw with a notch in its forward end for receiving the forward end of the moveable jaw. This construction is my new concept for a superior gripping action in which the upper jaw extends between forwardly extending portions of the lower jaws and the gripping effect is complete.

To my knowledge jaws of the prior art for these purposes have had only small forward portions which are adapted to touch each other.

It is another object of this invention to provide jaws having along the majority of their lengths substantially parallel oppositely disposed surfaces, which either touch or almost touch, whereby a great many objects can be gripped which are of a relatively small or thin nature and yet a complete "closure" around an object is assured because the overlapping forward ends of the jaws tend to trap a smaller object or snake, or a smaller animal in an area bounded by the opposed surfaces of the jaws.

A particular object is to provide the tool with a trigger which is pivoted from an axis disposed substantially to one side of the shank so that there is an adequate distance between such an axis and the point at which the rearward end of flexible connecting cable is secured to the trigger, whereby a great amount of trigger motion is possible without the trigger striking a hand grip extending generally parallel to it.

SUMMARY OF THE INVENTION

A pick-up tool including in combination with an elongated tubular shank, a handle having a hand grip portion extending transversely to the shank in one direction, and having a trigger receiving portion extending transversely to the shank in an opposite direction from the handle, the trigger receiving portion of the handle being hollow, a trigger in said trigger receiving portion and extending outwardly therefrom in a direction transverse to said shank and generally parallel to said handle, said trigger being pivotally attached to said trigger receiving portion of said handle for pivoting about an axis substantially disposed to that side of said shank which is opposite said handle, a fixed jaw secured to the opposite end of said shank, a moveable jaw disposed opposite said fixed jaw, means on the inner end of said fixed jaw for attachment to said moveable jaw, means pivotally attaching said moveable jaw to said attachment portion of said fixed jaw for the pivoting of said moveable jaw around a jaw axis transverse to said shank, resilient means attached to said moveable and fixed jaws and urging said moveable jaw into an open position, a connection member connecting said moveable jaw with said trigger in a manner so that as said trigger is moved toward said handle said moveable jaw will close toward said fixed jaw.

The fixed jaw has a notch in its forward end into which said moveable jaw moves at times of a maximum closing of said jaws, the forward end of said fixed jaw extending forwardly and transversely to said shank and at an inclination to said shank, the forward end of said moveable jaw extending forwardly at an inclination with respect to said shank and at an obtuse angle with respect to said shank at times when said moveable jaw is in closed position, whereby said moveable and fixed jaws lap each other at their forward ends, as seen in side elevation parallel to said jaw axis.

A further object is to provide the lower jaw with a recess into which a spring is received for serving as the resilient member urging said moveable jaw into open position.

A particular object of the invention is to provide for the connction member being flexible such as a flexible cable and having a slacking portion intermediate said jaws and said trigger, tensioning means such as a tension spring disposed across the slacking portion in the cable, and means attached to the cable at opposite ends, respectively, of the slacking portion of the cable and engageable by the tensioning means so that whenever said cable is not drawn and completely taut said tensioning means will cause slack to be present in said slacking portion of said cable by urging the ends of the slacking portion of the cable toward each other with an amount of tension which is overcomeable by an average operator by pressing said trigger towards said handle sufficiently to draw said flexible connecting member into taut relationship so as to remove the slack from said slacking portion whereby maximum pressure can be exerted in closing said jaws.

BRIEF DESCRIPTION OF THE DRAWING

FIG. 1 is a side elevation of the pick-up tool of this invention shown with portions of its lower jaw, shank and handle removed for showing the interior construction, parts of which latter are shown in cross-section, the open position of the jaws being shown in full lines, and the closed position of the moveable jaw being shown in dotted line.

The tension spring being partially diagrammatically shown so as to illustrate a slacking portion of a cable therein.

FIG. 2 is a top plan view of a forward portion of the fixed jaw.

DESCRIPTION OF THE PREFERRED EMBODIMENT

The remote gripping tool of this invention is generally indicated at 10 in FIG. 1 and comprises an elongated fixed jaw and shank assembly 12, the rearward portion of which is in the form of a tubular member having a transverse handle 20 attached thereto and projecting from one side thereof. The handle 20 is preferably in the general form of a pistol grip and has a rearward side 24. The handle 20 extends transversely to the tubular shank and fixed jaw assembly 12, which latter is elongated substantially in a straight line.

A trigger attachment assembly generally indicated at 26 attaches the handle 20 to the rearward end of the shank and lower jaw assembly 12 and also prvides means for mounting a trigger as later described, the trigger attachment assembly 26 having a cavity 27 therein receiving a trigger later described and which opens at its lower end for movements of the later described trigger forward and rearward, the cavity 27 being for receiving therein the upper end of the trigger 30. The uppermost end of the trigger 30 is pivotally secured by a pin 32 to the upper portion 26 of the handle 20, so as to swing about an axis 34, which is transverse to the length of the straight shank 12 and disposed to one side of the shank 12, that side being opposite to the side toward which the pistol grip portion 24 projects. The trigger 30 extends in the same direction as the pistol grip portion 24 substantially the same distance or at least enough so that a person can get three fingers thereon to pull the trigger 30 at a time when the index finger is disposed along side the shank 12 for guidance and control as is particularly valuable when catching moving animals or snakes. The forward side of the trigger 30 is spaced from the rearward side 24 of the handle 20 a distance such that an average adult person can extend fingers around the trigger 30 for operating it at a time when another part of the inner side of an operator's hand, such as the inner side of the operator's thumb or the middle of the operator's hand is disposed against the rearward side 24 of the handle 20.

The handle 24 has a protrusion 38 on its rearward side and at its upper end to receive thereagainst the upper portion of an operator's hand.

At the forward end of the shank 12 is a head, generally indicated at 50, which has a lower jaw 52 fixed thereto, the jaw 52 being rigid with the shank 12.

The head 50 receives the inner end portion 58 of the upper jaw 60 therein and the head 50 is hollow for that purpose and the lower jaw 52 is hollow also for the purpose of receiving a spring or resilient member 70.

The head 50 has an ear assembly 74, to which the upper jaw 60 is connected in a manner for pivoting about an axis 78, which latter can be called the forward axis or jaw axis 78 and which latter is parallel to the axis 34 and at a right angle to the elongated shank 12. The hollow interior 84 of the head 50 receives a spring 70 which is anchored at its forward end 88 to the fixed jaw 52, the spring 70 extending upwardly and rearwardly, its rearward end is fixed suitably by a wire portion 94 to a downwardly projecting portion 98 of the moveable jaw 60, the wire portion 94 being anchored at a point 104, which latter is disposed along a pin 106, which is transverse to the elongation of the moving jaw 60 so that the spring 70 tends to pull the moving jaw 60 into the open position, shown in full lines in FIG. 1.

The moving jaw 60 has a generally straight under surface 122 which curves downwardly at its forward end sharply, as seen at 124. The outer side of the jaw 60 likewise curves downwardly at 126 and the jaw portion 124 is adapted to rest between two spaced portions 128 of the lower jaw or fixed jaw 52, the portions 128 projecting from the forward end of the lower or fixed jaw 52 and disposed on opposite sides of a notch 134 formed purposely to receive the down-turned forward end 142 of the jaw 60 therebetween. The portions 128 of the fixed jaw 52 curve upwardly, as seen in FIG. 1, so that the overlap is such that when the moving jaw 60 is in its closed position, shown in dotted lines in FIG. 1, the curved forward portion 142 of the moving jaw 60 will make a cris-cross with the upturned portions 128 of the fixed jaw 52, whereby the portions 128 project upwardly and beyond the moving jaw portion 142 and likewise the moving jaw portion 142 projects downwardly beyond the upwardly curved under surface 148 of the fixed jaw 52, as shown in dotted lines in FIG. 1.

As seen in FIGS. 1 and 2, the spring 70 and all parts shown are on the same scale in both of these figures of the drawing and the notch 134 will be seen to extend substantially less than half the length of the fixed jaw and the fixed jaw 52 will be seen in FIG. 2 to have a dimension transversely of the shank 12 which is less than twice the width of the shank 12.

In FIG. 1 it will be seen that the terminal end portions of the opposed surfaces of the jaws 52 and 60 each incline toward the other when the jaws are open and each laps the other when the jaws are closed, with the terminal end portion of the movable jaw 60 received in the notch 134 in the fixed jaw 52.

A connection unit or assembly is generally indicated at 179 and connects the moving jaw 60 to the trigger 30 as later described, and comprising all parts disposed between the moveable jaw 60 and trigger 30 beginning with a control cable 180.

The off-set or downwardly protruding part 98 of the moving jaw 60 is attached at the point 104 also to the pull cable or control cable 180 and the attachment of the forend of the cable 180 can be by passing it around a pin 106 at the point 104 and then swaging the end with a swaging clamp 184. The cable 180 extends rearwardly to a pin 188 attached to the trigger 30 and extending transversely thereto, the pin 188 being at a point 190 of a trigger 30 which is disposed in the most desired position for maintaining the cable 180 free of contact with the inner side of the shank 12 and particularly for keeping a coiled spring or resilient member 200 fixed around the cable 180 from touching the inner side of the shank 12.

The spring 200 has an elongated central portion 202 and contracted end portions 204, each of which is disposed on the opposite side of the center of the elongated spring 200 from a swaging ball 210 near the forward end of the spring 200 and a swaging ball 212 near the rearward end of the spring 200. Both swaging balls 210 and 212 are spaced inwardly from the ends of the spring 200 so as to engage the inner sides of the contracted portions 204 whereby the spring 200 tends to draw that portion slacking section 230 of the cable 180 which is disposed between the balls 210 and 212 into a slack relationship, as shown in FIG. 1, although tension from the trigger 30 being pulled toward the handle 20 can and will draw the cable 180 out straight by expanding the spring 200 so that the spring 200 comes to have no effect and so that the pull on the cable 180 is just as forceful as the full effect of the grip of the operator on the trigger 30 can make it for giving a maximum of pressure between the jaws for maximum of gripping.

A connection assembly generally indicated at 238 interconnects the pins 104 and 188, and has in its parts the cable 180, the spring 200, the swaging balls 210 and 212 and suitable means connecting the ends of the cable 180 to the respective pins 104 and 188.

As best seen in side elevation in FIG. 1, the opposed surfaces of the fixed lower jaw 52 and of the moveable upper jaw 60, as seen in side elevation, are cooperatively shaped for being substantially in engagement with each other along the majority of the opposed jaw surfaces as measured lengthwise of the elongated shank 12.

As best seen in FIG. 1, each of the jaws 52 and 60 has blunt terminal surfaces as seen in side elevation, and one of the jaws which is the fixed jaw 52 can be seen in FIG. 2 to have blunt terminal surfaces in top plan view.

In FIG. 1 it can be seen that the opposed surfaces of the jaws 52 and 60 are substantially smooth, as seen in side elevation.

Referring to FIG. 1, it can be seen that the terminal end portions 124 of the moveable jaw 60 and 128 of the fixed jaw 52 have opposed surfaces which are inclined towards each other, as seen in side elevation in FIG. 1, when the jaws are in open position. And in dotted lines in FIG. 1 it will be seen that the terminal end portions 124 and 128 of the jaws are in a lapping relationship when the jaws are fully closed as seen in side elevation.

Attachment of the tubular shank 12 to the handle 24 is accomplished by the means of there being provided on the forward end of the upper portion 26 of the handle a forwardly projecting tubular portion 302 which latter laps the rearward end 304 of the tubular shank 12. Since the portion 302 is cylindrical on its exterior and makes a snug fit with a cylindrical interior of the tube 304, a good fit is provided and the simple provision of a pop rivet 310 is suitable for connecting the tubular portion 302 with the tubular shank 12. A second pop rivet 312 can also be used.

I claim:

1. A pick-up tool comprising an elongated shank, a fixed jaw attached to a forward end of said shank, a moveable jaw, means attaching said moveable jaw to said fixed jaw for the pivoting of said moveable jaw about a jaw-axis disposed at a right angle to the elongation of said shank, said fixed jaw and shank defining a jaw and shank assembly, resilient means connecting said moveable jaw with said jaw and shank assembly in a manner for urging said moveable jaw into open position with respect to said closed jaw, a connection unit attached to said moveable jaw and extending rearwardly along said shank, connection unit tensioning means disposed at the rearward end of said shank and manually operable for tensioning said connection unit so as to urge said moveable jaw toward said fixed jaw, said connection unit having a flexible slacking section, a resilient assembly comprising a resilient means and means connected to said connection unit at each end of said slacking section and engageable by said resilient means in a manner such that said resilient means urges the ends of said slacking section towards each other for putting slack in said connection unit.

2. The pick-up tool of claim 1 having the opposed surfaces of said jaws cooperatively shaped for being substantially in engagement with each other along the majority of said opposed jaw surfaces as measured lengthwise of said shank and as seen in side elevation and when said jaws are substantially closed.

3. The pick-up tool of claim 2 having the terminal end portions of the opposed surfaces of said jaws inclined towards each other as seen in side elevation view when said jaws are open and being in overlapping relationship when said jaws are fully closed as seen in side elevation view.

4. The pick-up tool of claim 3, the opposed surfaces of said jaws being cooperatively shaped for being substantially in engagement with each other along the majority of said opposed jaw surfaces as measured lengthwise of said shank and as seen in side elevation and when said jaws are substantially closed, said fixed jaw having blunt terminal surfaces as seen in side elevation and in top plan view.

5. The pick-up tool of claim 2 having the opposed surfaces of said jaws substantially smooth as seen in side elevation.

6. The pick-up tool of claim 1 having the opposed surfaces of said jaws cooperatively shaped for being substantially in engagement with each other along the majority of said opposed jaw surfaces as measured lengthwise of said shank and as seen in side elevation and when said jaws are substantially closed, said fixed jaw having blunt terminal surfaces as seen in side elevation and in top plan view.

7. A pick-up tool comprising an elongated shank, a fixed jaw attached to a forward end of said shank, a moveable jaw, means attaching said moveable jaw to said fixed jaw for the pivoting of said moveable jaw about a jaw-axis disposed at a right angle to the elongation of said shank, said fixed jaw and shank defining a jaw and shank assembly, resilient means connecting said moveable jaw with said jaw and shank assembly in a manner for urging said moveable jaw into open position with respect to said fixed jaw, a connection assembly attached to said moveable jaw and extending rearwardly along said shank, connection assembly tensioning means disposed at the rearward end of said shank and manually operable for tensioning said connection asssembly so as to urge said moveable jaw toward said fixed jaw, said fixed jaw having a cavity therein in which at least the major portion of said resilient means is disposed, said connection assembly having a flexible slacking section, a resilient assembly comprising a resilient means and means connected to said connection assembly at each end of said slacking section and engageable by said resilient means in a manner such that said resilient means urges the ends of said slacking section towards each other for putting slack in said connection assembly.

8. The pick-up tool of claim 7, said fixed jaw having blunt terminal surfaces as seen in side elevation and in top plan view.

* * * * *